US012731157B1

(12) United States Patent
Gout et al.

(10) Patent No.: US 12,731,157 B1
(45) Date of Patent: Sep. 8, 2026

(54) VIRTUAL COACHING ASSISTANT

(71) Applicant: United Services Automobile Association (USAA), San Antonio, TX (US)

(72) Inventors: Michael P. Gout, San Antonio, TX (US); Fredrick W. Rodgers, Frisco, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1180 days.

(21) Appl. No.: 17/217,676

(22) Filed: Mar. 30, 2021

Related U.S. Application Data

(60) Provisional application No. 63/002,943, filed on Mar. 31, 2020.

(51) Int. Cl.
*G06Q 30/016* (2023.01)
*G06N 20/20* (2019.01)

(52) U.S. Cl.
CPC .......... *G06Q 30/016* (2013.01); *G06N 20/20* (2019.01)

(58) Field of Classification Search
CPC ............................ G06Q 30/016; G06N 20/20
See application file for complete search history.

(56) References Cited

U.S. PATENT DOCUMENTS 11,477,142 B1* 10/2022 Lewis .................... G06F 40/30
2014/0143018 A1* 5/2014 Nies .................. G06Q 30/0201 705/7.29
2015/0207765 A1* 7/2015 Brantingham ........ H04L 51/046 715/758
2018/0165582 A1* 6/2018 Cha ........................ G06N 20/00
2019/0050774 A1* 2/2019 Divine .................. G16H 50/20
2019/0236132 A1* 8/2019 Zhu ........................ G06F 40/30
2020/0160356 A1* 5/2020 McCord ................. G10L 15/22
2020/0394590 A1* 12/2020 Kaimal ............. G06Q 30/0281
2021/0097329 A1* 4/2021 Jia ............................ G06N 3/08
2021/0201327 A1* 7/2021 Konig ................. G06Q 30/015
2021/0306458 A1* 9/2021 Shi ........................... G06N 3/08
2021/0377611 A1* 12/2021 Bress .................. H04N 21/251

OTHER PUBLICATIONS

Zhou et al., Progress in Neural NLP: Modeling, Learning, and Reasoning, Jan. 2020 (Year: 2020).*
Zhou et al., Progress in Neural NLP: Modeling, Learning, Reasoning, Jan. 2020 (Year: 2020).*

* cited by examiner

*Primary Examiner* — Tamara T Kyle
*Assistant Examiner* — Jacqueline C. Meyer
(74) *Attorney, Agent, or Firm* — BakerHostetler

(57) ABSTRACT

A virtual coaching assistant may train one or more machine learning models to determine an output that is likely to result in an optimal outcome for a customer service agent based on a customer service scenario. The virtual coaching assistant may apply the trained models to data sets indicating customer service scenarios. The virtual coaching assistant may determine to import one or more of the models. The virtual coaching assistant may feed a data set to the model to receive an output. The virtual coaching assistant may generate a coaching suggestion based on one or more outputs from one or more models. The virtual coaching assistant may transmit the coaching suggestion to a user device.

18 Claims, 5 Drawing Sheets

VIRTUAL COACHING ASSISTANT

CROSS-REFERENCE TO RELATED APPLICATION

This patent application claims priority to and the benefit of provisional patent application 63/002,943 filed Mar. 31, 2020, which is incorporated herein by reference in its entirety.

BACKGROUND

The training of employees in the customer service field suffers from various flaws. For example, it is very resource intensive. New customer service agents require lengthy training to overcome the initial learning curve. Tenured agents require continuous training, such as to ensure compliance with updated company policies or to be knowledgeable of new products. As another example, customer service employee training is also not always effective, as coaches cannot predict all of the possible scenarios that a customer service agent may encounter and cannot predict what agent responses will result in optimal outcomes, such as customer satisfaction or making of a sale. It is also difficult to train agents and coaches to instill culture. Therefore, improvements in customer service agent training are needed.

SUMMARY

A virtual coaching assistant may comprise a machine learning-based system that improves the training of customer service agents. The virtual coaching assistant may comprise one or more models that are trained using customer service data, such as particular situations, coaching suggestions provided, and/or customer outcomes. The model may be configured to determine the coaching suggestion for any situation that is most likely to result in an optimal customer outcome.

The virtual coaching assistant may be configured to receive data from agent-customer sessions and/or agent-coach sessions (e.g., audio records, transcripts, wave profiles, etc.). The virtual coaching assistant may predict one or more scenarios from the received data. The virtual coaching assistant may determine to import one or more machine learning models based on the predicted scenarios. The virtual coaching assistant may feed the data and predicted scenarios to the model to generate an output. The virtual coaching assistant may feed the output to another model. Based on one or more of the outputs, the virtual coaching assistant may generate a coaching suggestion. The virtual coaching assistant may transmit the coaching suggestion to a user device, such as a device of the agent and/or a device of the coach.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
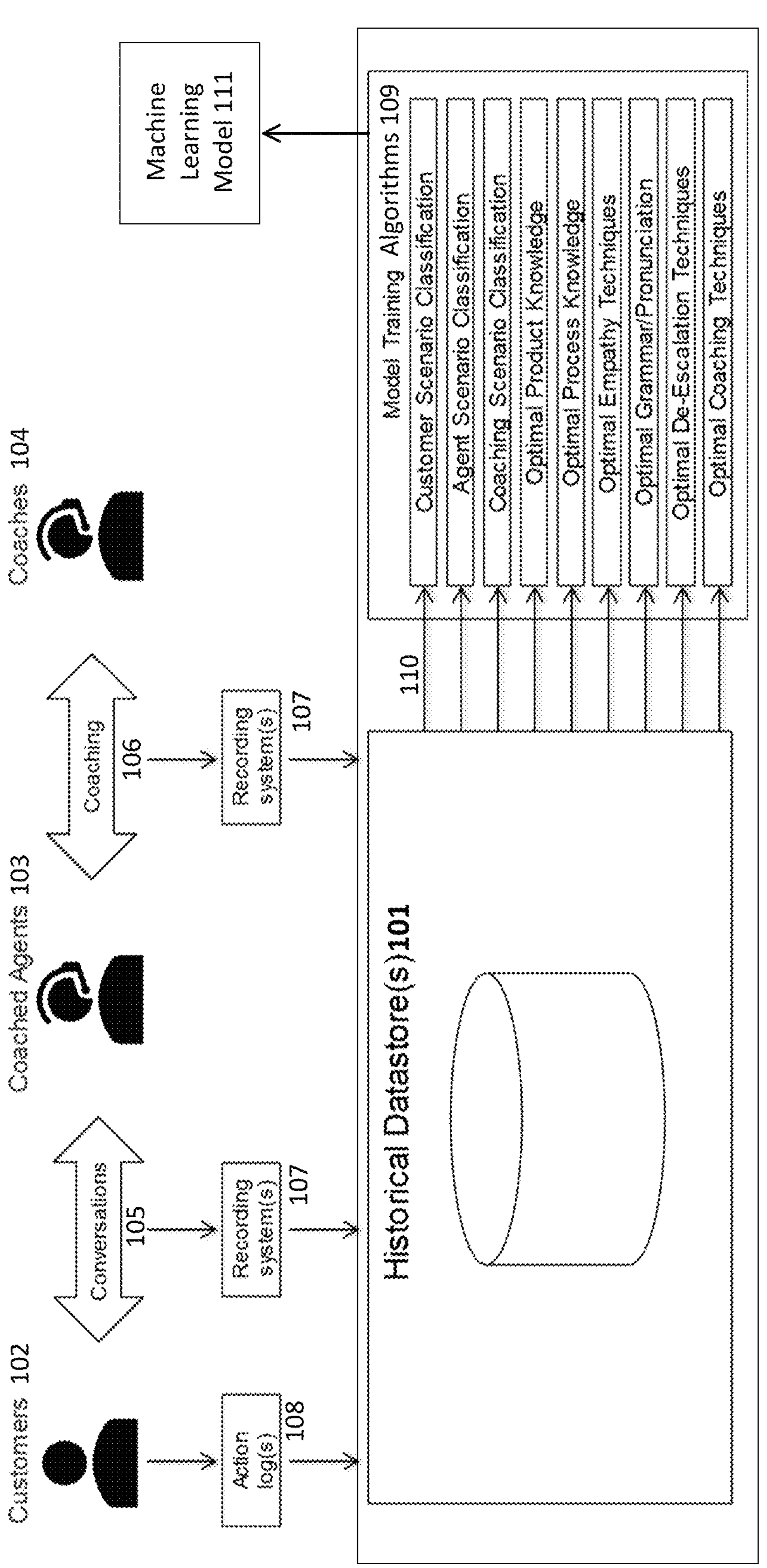
FIG. 1 shows an example virtual coaching assistant.

FIG. 1 shows an example virtual coaching assistant 100. The virtual coaching assistant 100 may comprise a computing device. The virtual coaching assistant 100 may comprise software on a computing device, such as an application on a user device. The virtual coaching assistant 100 may comprise a system of computing devices, such as a network of servers or cloud computers.

The virtual coaching assistant 100 may comprise a historical datastore 101. The historical datastore 101 may comprise a memory. The historical datastore 101 may comprise a database. Alternatively, the historical datastore 101 may be external to the virtual coaching assistant 100, such as on another device. In this context, a "device" can be one or more devices, networked resources, or other instrumentalities for effecting the desired result, i.e., storing and providing information from a data store and/or processing data for transformation or calculation, et cetera. The virtual coaching assistant 100 may have access to the historical datastore 101 on the other device.

The historical datastore 101 may be configured to store data associated with interactions 105, 106 between users 102, 103, 104. The users 102, 103, 104 may comprise customers 102, customer service agents 103 (including but not limited to member service representatives or "MSRs"), and/or coaches 104, as examples. The interactions 105, 106 may comprise conversations 105, such as between the customers 102 and the agents 103. The interactions 105, 106 may comprise coaching 106, such as between the agents 103 and the coaches 104. The coaching 106 may occur contemporaneous to at least a portion of a conversation 105. For example, a coach 104 may listen to a conversation 105 between an agent 103 and a customer 102. The coach 104 may provide suggestions to the agent 103, such as corrections of statements of the agent 103 to the customer 102 and/or prompts for the agent 103. The interactions 105, 106 may comprise verbal communications. The interactions 105, 106 may comprise textual communications, such as via email, text message, and/or web chat.

The interactions 105, 106 may be recorded, such as by recording systems 107. The recording systems 107 may be configured to generate audio recordings (e.g., .mp3 files, .wav files, etc.). The recording systems 107 may be configured to generate textual transcripts (e.g., .txt files, .doc files, etc., such as a .GEXF file, a .GraphML file, a .JGF file, etc.). The recording systems 107 may be configured to generate wave profiles (e.g., a graph, a table, etc.). The records from the recording systems 107 may be stored in the historical datastore 101. The records may be stored by the recording systems 107, the virtual coaching assistant 100, and/or another computing device.

An action log 108 may be generated. The action log 108 may comprise records of actions performed by the customers 102. The actions may comprise requests, complaints, and/or transactions, as examples. The action log 108 may be generated by one or more user devices, such as the devices of the customers 102. The action log 108 may be generated by the virtual coaching assistant 100 and/or another computing device. The action log 108 may be stored to the historical datastore 101. The action log 108 may be stored to the historical datastore 101 by a recording system 107, the virtual coaching assistant 100, and/or another computing device.

The virtual coaching assistant 100 may be configured to use the data stored to the historical datastore 101 to train a machine learning model 111. The virtual coaching assistant 100 may generate a data set 110 using the data stored to the historical datastore 101. The data set 110 may comprise a training data set, a validation data set, and/or a test data set, as examples. The data set 110 may comprise data associated with a scenario. The data set 110 may comprise one or more feature vectors. The feature vectors may comprise lists and/or arrays of values for features of a scenario. A feature may comprise a measurable property or characteristic of a subject being observed, such as a classification label, a period of time, an identity, a geographic location, a volume, a frequency, etc. A feature may comprise a property or characteristic of a scenario. A feature may comprise a property or characteristic of a specific user 102, 103, 104 and/or a specific interaction 105, 106 in a scenario. For example, a feature vector may comprise scenario feature values associated with a conversation 105 between a customer and an agent.

The scenario feature values may comprise a classification of a scenario as a customer scenario, an agent scenario, and/or a coaching scenario. The scenario feature values may comprise a customer action. The scenario feature values may comprise a conversation topic, such as a product, a service, and/or an event being discussed. The scenario feature values may comprise user demographic, such as an age, gender, ethnicity, and/or profession of a user. The scenario feature values may comprise a user emotion, such as angry, happy, sad, frustrated, and/or afraid. The scenario feature values may comprise an identity of a user, such as a role of the user (e.g., customer, agent, coach, etc.), a name of the user, a username of the user, and/or an account of the user. The scenario feature values may comprise a coach's suggestion to the agent, such as product information, service information, process information, empathy techniques, grammar, pronunciation, and/or de-escalation techniques. The scenario feature values may comprise a suggestion to a coach, such as a coaching technique. The scenario feature values may comprise an agent response. The scenario feature values may comprise an outcome.

The scenario feature values may comprise numerical values. The scenario feature values may comprise binary values (e.g., true/false, yes/no, etc.). The scenario feature values may comprise strings. The virtual coaching assistant 100 may be configured to determine the feature values. The virtual coaching assistant 100 may be configured to determine a quantitative value for a scenario feature. For example, the virtual coaching assistant 100 may be configured to assign scores to the outcomes. The scores may be determined based on a customer rating, indications of customer emotion (e.g., happiness, satisfaction, gratitude, etc.). The scores may be determined based on a customer action, such as making a purchase and/or entering into an agreement. The scenario feature values may be provided by another computing device and stored to the historical datastore 101.

The data set 110 may be input to a machine learning algorithm 109 to produce a model 111. The model 111 may comprise a classifier model. Given a scenario, the model 111 may be configured to determine a coaching suggestion that will result in an optimal outcome. For example, the model 111 may determine a coaching suggestion with a highest probability of resulting in an optimal outcome. An optimal outcome may comprise making a sale of a product or service to a customer 102. An optimal outcome may comprise a high customer satisfaction rating, such as a 10 rating on a 0-10 scale. The optimal outcome may comprise receiving positive customer feedback, such as a "very satisfied" response or a "yes" response to a survey question like "did the agent answer all your questions?". An optimal outcome may comprise causing a customer 102 to assume a positive (e.g., happy, grateful, calm, humored, etc.) emotion. What constitutes an optimal outcome may be defined in a training data set, such as the data set 110. The optimal outcome may be defined by a user. The optimal outcome may be determined by the virtual coaching assistant 100, such as by comparing outcomes in the training data set and determining a best outcome and/or ranking the outcomes.

The coaching suggestion may comprise a prompt for the agent and/or the coach, such as a response and/or information for the agent to communicate to the customer. The information may comprise information about a product and/or a process. The coaching suggestion may comprise a script for the agent and/or the coach. The script may comprise one or more lines of text that the agent and/or the coach should read aloud. The script may comprise one or actions that the agent and/or the coach should take.

The coaching suggestion may comprise a playbook for the agent and/or the coach. The playbook may show statements and/or actions. The playbook may show decision points linked to the statements and/or actions with branches and/or options of possible outcomes and/or responses to the statements and/or actions. The playbook may show statements and/or actions to take in response to the outcomes and/or responses. The playbook may comprise a decision tree and or map that guides the agent and/or the coach through the scenarios and provides suggested statements and/or actions for various possible outcomes and/or responses. The playbook may be broken into parts and/or phases (e.g., parts of a discussion). Each part may comprise various suggested statements, actions, and/or characteristics (e.g., tone, diction, etc.). In this way, the models may predict what characteristics should be used during different points in an interaction.

The coaching suggestion may comprise an indication to express empathy. The coaching suggestion may comprise an indication to express a particular emotion. The coaching suggestion may comprise a piece of information and/or a prompt, such as an answer to a question. The coaching suggestion may comprise a question to ask. The coaching suggestion may comprise a correction of an agent statement, such as a correction of a grammatical error or a factual error in the statement of the agent. The information may comprise an indication of a de-escalation technique for the agent to employ. The coaching suggestion may comprise a suggestion from a training data set, such as data set 110. The coaching suggestion may comprise a combination of at least a portion of one or more suggestions in the training set.

Figure 2:
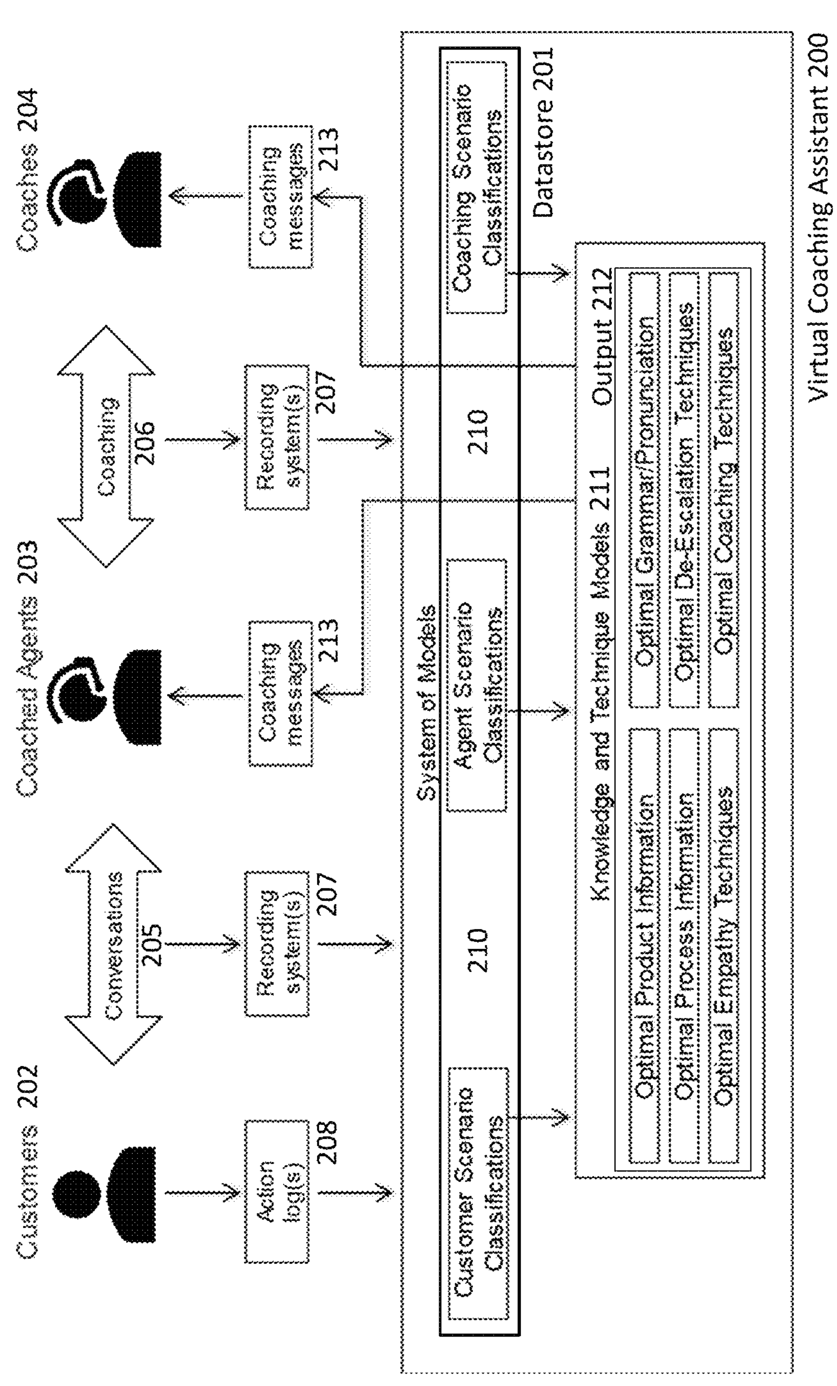
FIG. 2 shows an example virtual coaching assistant.

FIG. 2 shows an example virtual coaching assistant 200. The virtual coaching assistant 200 may be similar to the virtual coaching assistant 100 in FIG. 1. The virtual coaching assistant 200 may comprise and/or have access to one or more machine learning models 211. The virtual coaching assistant 200 may be configured to use one or more of the machine learning models 211 to make coaching suggestions to users 202, 203, 204.

The machine learning models 211 may have been trained by the virtual coaching assistant 200 and/or by another device. The machine learning models 211 may have been trained using a method similar to the method described with respect to FIG. 1. The machine learning models 211 may comprise one or more models acquired from a third-party, such as commercially-available models or proprietary models developed independently from virtual coaching assistant 200.

The virtual coaching assistant 200 may comprise a datastore 201. The datastore 201 may comprise a memory. The datastore 201 may comprise a database. Alternatively, the datastore 201 may be external to the virtual coaching assistant 200, such as on another device. The datastore 201 may comprise a same datastore and/or a different datastore as the historical datastore 101 in FIG. 1.

The historical datastore 201 may be configured to store data associated with interactions 205, 206 between users 202, 203, 204. The users may comprise customers 202 (such as customers 102 in FIG. 1), customer service agents 203 (such as customer service agents 103 in FIG. 1), and/or coaches 204 (such as coaches 104 in FIG. 1), as examples. The interactions 205, 206 may comprise conversations 205, such as between the customers 202 and the agents 203. The interactions 205, 206 may comprise coaching 206, such as between the agents 203 and the coaches 204. The coaching 206 may occur contemporaneous to at least a portion of a conversation 205. The interactions 205, 206 may comprise verbal communications. The interactions 205, 206 may comprise textual communications, such as via email, text message, and/or web chat.

The interactions 205, 206 may be recorded, such as by recording systems 207. The recording systems 207 may be configured to generate audio recordings. The recording systems 207 may be configured to generate textual transcripts. The recording systems 207 may be configured to generate wave profiles. The records from the recording systems 207 may be stored in the datastore 201. The records may be stored by the recording systems 207, the virtual coaching assistant 200, and/or another computing device.

An action log 208 (such as the action log 108 in FIG. 1) may be generated. The action log 208 may be generated by a user device, the virtual coaching assistant 200, and/or another computing device. The action log 208 may comprise records of actions performed by the customers 202. The actions may comprise requests, complaints, and/or transactions, as examples. The action log 208 may be stored to the datastore 201. The action log 208 may be stored to the datastore 201 by a recording system 207, the virtual coaching assistant 200, and/or another computing device.

The virtual coaching assistant 200 may be configured to use the data stored to the datastore 201 to generate coaching suggestions. The virtual coaching assistant 200 may be configured to generate coaching suggestions in response to receiving a request from a user. The request may indicate a scenario and/or one or more features of a scenario (e.g., an identity of a user 202, 203, 204, an interaction 205, 206, a time of the scenario, a date of the scenario, a classification of the scenario, etc.). The virtual coaching assistant 200 may be configured to generate coaching suggestions based on new data being stored to the datastore 201. The virtual coaching assistant 200 may be configured to generate coaching suggestions based on an interaction 205, 206 starting and/or occurring. The virtual coaching assistant 200 may be configured to make the coaching suggestions by feeding the data stored to the datastore 201 to one or more of the machine learning models 211. The virtual coaching assistant 200 may be configured to make the coaching suggestions by feeding data stored to the datastore 201 that is associated with the scenario of interest to one or more of the machine learning models 211.

In preparation for feeding the data to the models 211, the virtual coaching assistant 200 may be configured to generate a data set 210. The data set 210 may comprise an inference data set. The virtual coaching assistant 200 may be configured to generate the data set 210 using the data stored to the datastore 201. The data set 210 may comprise data associated with the scenario of interest.

The scenario may comprise a particular interaction 205, 206 between two or more users 202, 203, 204, such as a communication session. The scenario may comprise a customer scenario, such as a conversation 205 between a customer 202 and an agent 203. The scenario may comprise an agent scenario, such as statements made by an agent 203. The scenario may comprise a coaching scenario, such as a coaching 206 of an agent 203 by a coach 204. The data may indicate a classification of the scenario type (e.g., customer scenario, agent scenario, coaching scenario, etc.).

The data set 210 may comprise one or more feature vectors. The feature vectors may comprise lists and/or arrays of values for scenario features. A feature vector may comprise scenario feature values associated with a specific scenario of interest. The scenario feature values may comprise a classification of the scenario as a customer scenario, an agent scenario, and/or a coaching scenario. The scenario feature values may comprise an indication of a customer action. The scenario feature values may comprise an indication of a conversation topic, such as a product, a service, and/or an event being discussed. The scenario feature values may comprise an indication of a user demographic, such as an age, gender, ethnicity, and/or profession of a customer 202. The scenario feature values may comprise an indication of a user emotion, such as angry, happy, sad, frustrated, and/or afraid. The scenario feature values may comprise an identity of a user 202, 203, 204, such as a role of the user (e.g., customer, agent, coach, etc.), a name of the user, a username of the user, and/or an account of the user. The scenario feature values may comprise an indication of a coach's 204 suggestion to the agent 203, such as product information, service information, process information, empathy techniques, grammar, pronunciation, and/or de-escalation techniques. The scenario feature values may comprise an indication of a suggestion to a coach 204, such as a coaching technique. The scenario feature values may comprise an indication of an agent response. The scenario feature values may comprise an indication of an outcome.

As a non-limiting example, the data set 210 may comprise feature vectors similar to the following:

Feature Vector 1
- Scenario: Customer scenario
- Subject demographic: 32-year-old male
- Topic: Insurance claim initiation
- Action: Requested information
- Characteristics: Sympathetic, low volume, slow speech
- Outcome: Customer satisfaction rating of 8/10

Feature Vector 2
- Scenario: Agent scenario
- Subject demographic: 55-year-old female
- Topic: Insurance eligibility
- Action: Suggested flood insurance
- Characteristics: Energetic, high volume, fast speech
- Outcome: Insurance not purchased Feature Vector 3
- Scenario: Coaching scenario
- Subject demographic: 47-year-old male
- Topic: Bank account types
- Action: Presented diagram
- Characteristics: Encouraging, high volume, slow speech
- Outcome: 87% score on agent certification test The feature vectors in the data set 210 may have the same fields or different fields. Although the examples show descriptive classifications, keywords, and strings for some of the feature values, numerical values may be used to designate feature values, such as classifications and/or keywords. For example, for the "scenario" field, a "0" may denote a "Customer scenario, a "1" may denote an "Agent scenario,"

and a "2" may denote a "Coaching scenario." For the "Subject demographic" field, "0" may denote "male" and "1" may denote "female."

The scenario feature values may comprise numerical values. The scenario feature values may comprise binary values (e.g., true/false, yes/no, etc.). The binary values may be mapped to numeric values. For example, "0" may mean "no" and "1" may mean "yes."

As a non-limiting illustrative example, a feature vector could be the following:

Feature vector A

Agent scenario: 1
Customer scenario: 0
Training scenario: 0
Speech speed: 5
Speech volume: 3
Emotion range: 3-7
Satisfaction rating: 7

The virtual coaching assistant 200 may be configured to determine the feature values. The scenario feature values may be determined by another computing device and/or a user, such as a data scientist, and stored to the datastore 201.

The data set 210, such as one or more feature vectors, may be fed to a machine learning model 211. The model 211 may determine an output 212. The output 212 may comprise a scenario classification. The scenario classification and the data set 210 may be fed to another machine learning model 211, which may determine another output 212. The output 212 may comprise an output of a plurality of possible outputs 212 that the model 211 has determined is likely to result in an optimal outcome. The output 212 may comprise an output of a plurality of possible outputs 212 that the model 211 has determined to have a highest probability of the possible outputs 212 of resulting in an optimal outcome.

The output 212 may comprise a coaching suggestion 213. The coaching suggestion 213 may comprise a prompt for the agent and/or the coach, such as a response and/or information for the agent to communicate to the customer. The information may comprise information about a product and/or a process. The coaching suggestion 213 may comprise a script for the agent and/or the coach. The coaching suggestion 213 may comprise a playbook for the agent and/or the coach. The coaching suggestion 213 may comprise an indication to express empathy. The coaching suggestion 213 may comprise an indication to express a particular emotion. The coaching suggestion 213 may comprise a correction of an agent statement, such as a correction of a grammatical error or a factual error in the statement of the agent. The information may comprise an indication of a de-escalation technique for the agent to employ. The coaching suggestion 213 may comprise a suggestion from a training data set, such as data set 110. The coaching suggestion may comprise a combination of at least a portion of one or more suggestions in the training set.

The virtual coaching assistant 200 may be configured to generate a coaching suggestion 213 based on the output 212 of the model. If the output comprises information, the virtual coaching assistant 200 may generate a coaching suggestion 213 comprising a prompt and/or a script conveying the information. As an illustrative example, if the output comprises a model number 565, the virtual coaching assistant may generate the suggested statement "I think that the 565 series meets all of your needs." As another example, the virtual coaching assistant 200 may combine the output 212 of the model with the output 212 of another model to generate a coaching suggestion 213. For example, if the output of one model comprises a suggested emotion that is apologetic and the output of another model comprises information that is an expiration date of a warranty, the virtual coaching assistant may generate the suggested statement "I'm very sorry, but the warranty covering that item expired on Dec. 15, 2019."

The virtual coaching assistant 200 may be configured to output the coaching suggestion 213 to a user device. The user device may comprise a device associated with a customer, an agent, and/or a coach. The user device may comprise a device associated with a user 202, 203, 204 associated with the scenario in the data 210 fed to the model 211. The user device may comprise a device associated with a user 202, 203, 204 associated with the coaching suggestion 213. The user device may comprise a desktop computer, a laptop computer, a mobile phone, a tablet device, a display device, and/or another computing device, as examples.

The virtual coaching assistant 200 may output the coaching suggestion 213 in a text form, on a screen of the user device. The coaching suggestion 213 may be visible to one user 202, 203, 204 in an interaction 205, 206, but not to another user 202, 203, 204. For example, if the interaction 205, 206 comprises a conversation 205 between an agent 203 and a customer 202, the coaching suggestion 213 may be visible on a device of the agent 203 but not on a device of the customer 202. If the interaction 205, 206 comprises coaching 206 of an agent 203 by a coach 204, the coaching suggestion 213 may be visible on a device of the coach 204 but not on a device of the agent 203.

The virtual coaching assistant 200 may output the coaching suggestion 213 in an audio form, such as via a speaker of the user device. The coaching suggestion 213 may be audible to one user 202, 203, 204 in an interaction 205, 206, but not to another user 202, 203, 204. For example, if the interaction 205, 206 comprises a conversation 205 between an agent 203 and a customer 202, the coaching suggestion 213 may be output via a speaker of a device of the agent 203 but not on a device of the customer 202. If the interaction 205, 206 comprises coaching 206 of an agent 203 by a coach 204, the coaching suggestion 213 may be output via a speaker of a device of the coach 204 but not on a device of the agent 203.

The user 202, 203, 204 may follow the coaching suggestion 213. For example, if the coaching suggestion 213 comprises a script, the user 202, 203, 204 may read lines of the script to another user 202, 203, 204. For example, if the coaching suggestion 213 is associated with an agent scenario, an agent 203 may read text in the coaching suggestion 213 to a customer 202, such as a response to a question of the customer 202. If the coaching suggestion 213 is associated with an agent scenario, an agent 203 may follow a suggestion indicated by the coaching suggestion 213, such as to use a particular tone of voice. If the coaching suggestion 213 is associated with a coach scenario, a coach 204 may give an agent advice based on the coaching suggestion 213, such as to try a particular de-escalation technique.

Figure 3:
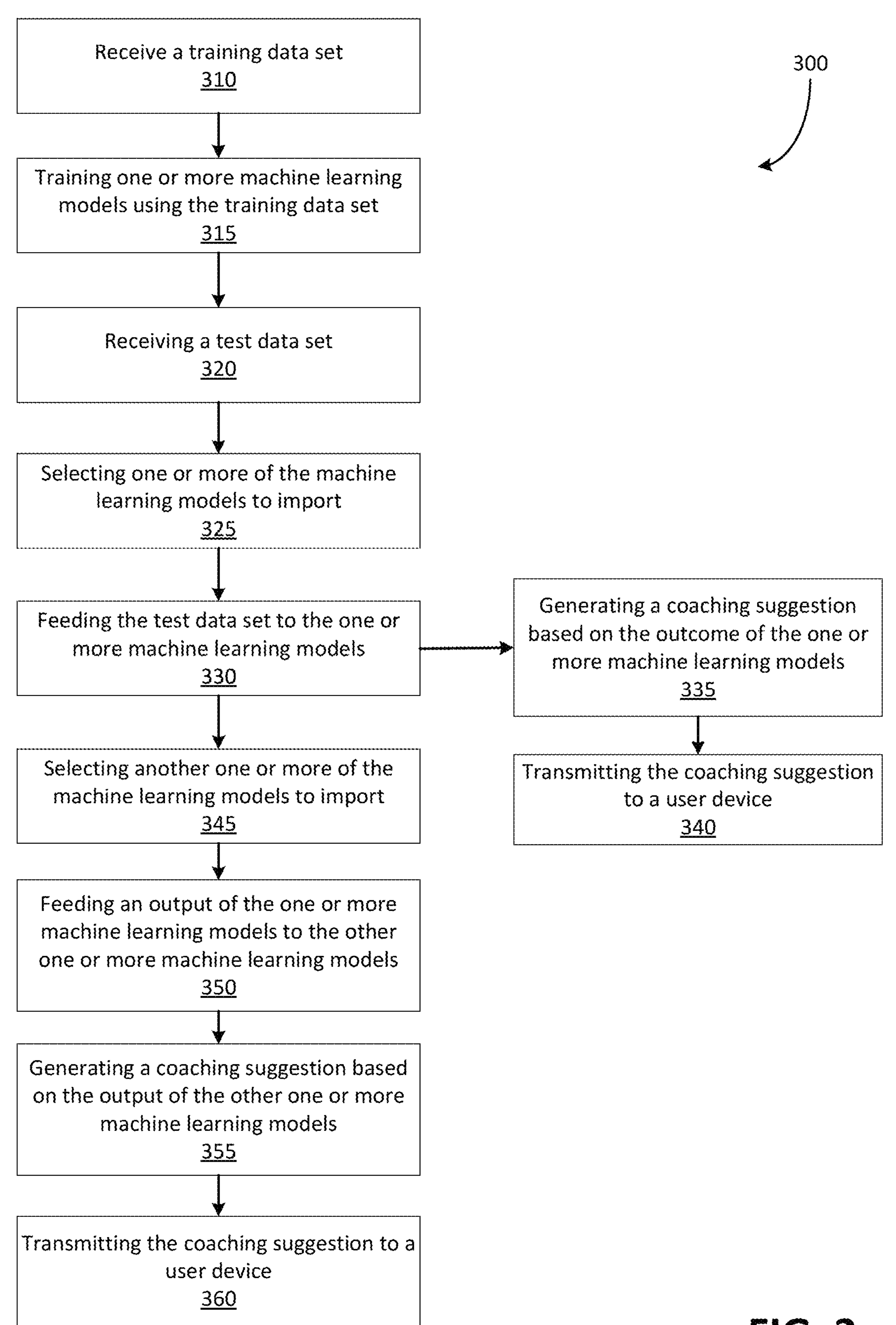
FIG. 3 shows an example virtual coaching assistant method.

FIG. 3 shows an example virtual coaching assistant method 300. At step 310, a first data set may be received. The first data set may comprise a training data set, a validation data set, and/or a test data set, as examples. The first data set may be received by a virtual coaching assistant (such as virtual coaching assistant 100 in FIG. 1, virtual coaching assistant 200 in FIG. 2). The first data set may be similar to the data set 110 in FIG. 1.

At step 315, one or more machine learning models may be trained. The machine learning models may be trained using the first data set. The machine learning models may be trained using a method similar to that described with respect to FIG. 1. The machine learning models may be similar to the machine learning model 111 in FIG. 1 and/or the machine learning model 211 in FIG. 2. The machine learning models may be trained by the virtual coaching assistant. Alternatively, trained models may be received from a third-party. The trained models may be saved, such as in one or more files and/or to a library.

At step 320, a second data set may be received. The second data set may be received by the virtual coaching assistant. The second data set may be similar to the data set 210 in FIG. 2. The second data set may comprise an inference data set. The second data set may be received from a recording system (such as recording system 107 in FIG. 1, recordings system 207 in FIG. 2).

At step 325, one or more of the machine learning models may be selected. The machine learning models may be selected based on the second data set. Each of the plurality of machine learning models may be configured to make determinations based on one or more features. Selecting the models may comprise determining one or more models that are configured to make determinations based on features present in the second data set. The second data set may comprise labels indicating the features.

The machine learning models may be selected based on a desired output. Different machine learning models may be configured to determine different outputs. For example, one machine learning model may be configured to determine outputs comprising indications of grammar. Another machine learning model may be configured to determine outputs comprising product information. Another machine learning model may be configured to determine a greeting. If a script for communicating with a customer is desired, such as based on a user request to the virtual coaching assistant, the machine learning model that is configured to determine the greeting may be determined.

The selected one or more machine learning models may be imported. Importing the models may comprise downloading the models to the virtual coaching assistant. Importing the models may comprise saving the models. Importing the models may comprise restoring, retrieving, and/or deserializing the models from a storage location, such as a file. Importing the models may comprise importing the models to a library, such as a scikit learn library, a tensor flow library, and/or an Apache Spark library.

At step 330, the second data set may be fed to the selected and/or imported machine learning models. The feature vector generated using the second data set may be fed to the models. The model may determine an output based on the second data set.

As an example, a machine learning model that is configured to classify a scenario based on the second data set may be selected. The model may be imported and the second data set may be fed to the model. Based on the second data set, the model may determine a classification of a scenario associated with the second data set.

At step 335, a coaching suggestion may be generated. The coaching suggestion may be generated based on the outcome of the one or more machine learning models. The coaching suggestion may comprise an indication of the outcome. The coaching suggestion may comprise the outcome and other data. The coaching suggestion may be determined based on the outcome and based on another outcome, such as of another model. For example, the outcomes may be combined to generate the coaching suggestion.

At step 340, the coaching suggestion may be transmitted to a user device. The coaching suggestion may be transmitted to a user device associated with a user associated with the scenario. The coaching suggestion may be output via a display and/or an audio speaker of the user device.

At step 345, alternatively or in addition to step 335, another of the machine learning models may be selected. The other machine learning model may be imported. However, the other machine learning model may have been selected and/or imported in step 325.

At step 350, the output of one or more machine learning models may be fed to the other machine learning model selected in step 345. A plurality of outputs of the models may be fed to the other model. The second data set may be fed to the other machine learning model.

As an example, if the first selected machine learning model output a classification of a scenario associated with the second data set, the classification of the scenario may be fed to another machine learning model. The second data set may also be fed to the other machine learning model. The other machine learning model may be configured to output a coaching suggestion based on the scenario classification and the second data set.

The other model may determine another outcome. The other outcome may be fed to yet another one or more models, such as to form a chain. The output of those models may be fed to another one or more models in the chain. There may be N models in the chain, where N is any number and the outputs of each model are fed to the next model in the chain. The virtual coaching assistant may determine a sequence of the models in the chain, such as based on a type of output that the models are configured to produce. Alternatively, a same input, such as a same feature vector may be fed to N models.

At step 355, a coaching suggestion may be generated. The coaching suggestion may be generated based on the output of the other machine learning model. The coaching suggestion may be generated based on a plurality of outputs of models. The outputs from the different models may be combined to generate a coaching suggestion. For example, each of the outputs may comprise a different aspect of the coaching suggestion. A first model may output content of a message. A second model may output diction for the message. A third model may output a tone for the message. A fourth model may output a translation of the message and/or the diction in another language.

At step 360, the coaching suggestion may be transmitted to a user device. The coaching suggestion may be transmitted to a user device associated with a user associated with the scenario. The coaching suggestion may be output via a display and/or an audio component of the user device.

Figure 4:
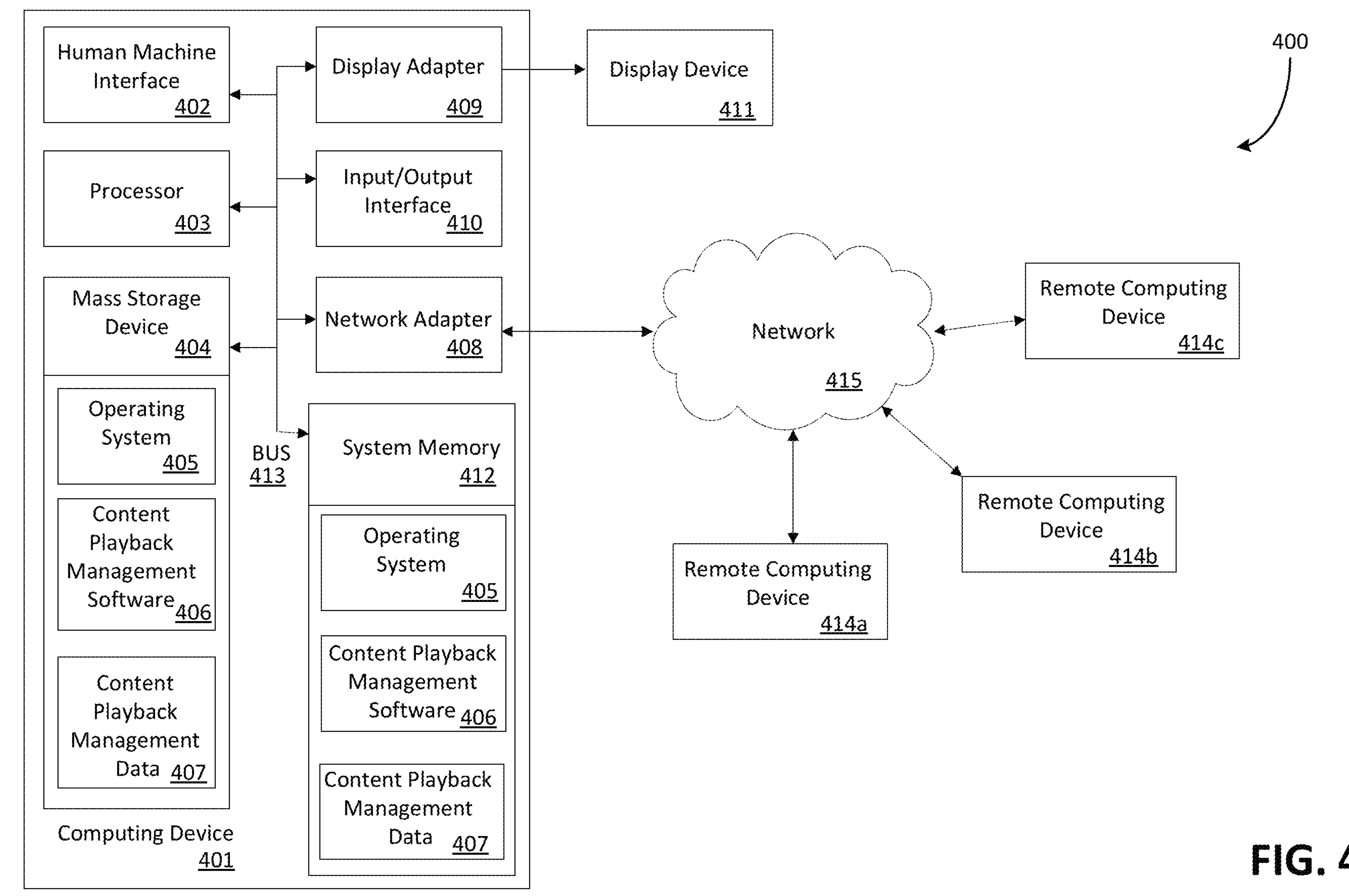
FIG. 4 shows an example computing environment.

FIG. 4 shows an example computing environment. The systems, methods, and apparatuses described herein may be implemented on a computing device such as a computing device 401 (e.g., computer) as shown in FIG. 4 and described below. For example, a virtual coaching assistant (such as virtual coaching assistant 100 in FIG. 1, virtual coaching assistant 200 in FIG. 2, etc.) may comprise the computing device 401 shown in FIG. 4. Similarly, the methods, systems, and apparatuses disclosed may utilize one or more computing devices 401 to perform one or more functions in one or more locations. This operating environment is not intended to suggest any limitation as to the scope of use or functionality of operating environment architecture. Neither should the operating environment be interpreted as having any dependency or requirement relating to any one or combination of components shown in the operating environment.

The systems, methods, and apparatuses described herein may be operational with numerous other general purpose or special purpose computing system environments or configurations. Computing systems, environments, and/or configurations that may be suitable for use with the systems, methods, and apparatuses comprise, but are not limited to, personal computers, server computers, laptop devices, and multiprocessor systems. Set top boxes, programmable consumer electronics, network PCs, minicomputers, mainframe computers, distributed computing environments that comprise any of the above systems or devices, and the like may be used to implement the methods, systems, and apparatuses.

The systems, methods, and apparatuses may be implemented, in whole or in part, by software components. The disclosed methods, systems, and apparatuses may be described in the general context of computer-executable instructions, such as program modules, being executed by one or more computers or other devices. Program modules comprise computer code, routines, programs, objects, components, data structures, etc. that perform particular tasks or implement particular abstract data types. The methods, systems, and apparatuses may be practiced in grid-based and distributed computing environments where tasks are performed by remote processing devices that are linked through a communications network. In a distributed computing environment, program modules may be located in both local and remote computer storage media including memory storage devices.

The methods, systems, and apparatuses may be implemented via a general-purpose computing device in the form of a computing device 401. The components of the computing device 401 may comprise, but are not limited to, one or more processors 403, a system memory 412, and a system bus 413 that couples various system components including the processor 403 to the system memory 412. With multiple processors 403, the system may utilize parallel computing.

The system bus 413 represents one or more of several possible types of bus structures, including a memory bus or memory controller, a peripheral bus, an accelerated graphics port, and a processor or local bus using any of a variety of bus architectures. Such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 413, and all buses specified in this description may be implemented over a wired or wireless network connection and each of the subsystems, including the processor 403, a mass storage device 404, an operating system 405, content playback management software 406, content playback management data 407, a network adapter 408, system memory 412, an Input/Output Interface 410, a display adapter 409, a display device 411, and a human machine interface 402, may be contained within one or more remote computing devices 414*a,b,c* at physically separate locations, connected through buses of this form, in effect implementing a fully distributed system.

The computing device 401 typically comprises a variety of computer readable media. Readable media may comprise any available media that is accessible by the computing device 401 and comprises both volatile and non-volatile media, removable and non-removable media. The system memory 412 comprises computer readable media in the form of volatile memory, such as random access memory (RAM), and/or non-volatile memory, such as read only memory (ROM). The system memory 412 typically contains data such as content playback management data 407 and/or program modules such as operating system 405 and content playback management software 406 that are immediately accessible to and/or are presently operated on by the processor 403.

The computing device 401 may comprise other removable/non-removable, volatile/non-volatile computer storage media. FIG. 4 shows a mass storage device 404 which may provide non-volatile storage of computer code, computer readable instructions, data structures, program modules, and other data for the computing device 401. A mass storage device 404 may comprise a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 404, including an operating system 405 and content playback management software 406. Each of the operating system 405 and content playback management software 406 (or some combination thereof) may comprise elements of the programming and the content playback management software 406. Content playback management data 407 may be stored on the mass storage device 404. Content playback management data 407 may be stored in any of one or more databases known in the art. Such databases may comprise, DB2®, Microsoft® Access, Microsoft® SQL Server, Oracle®, mySQL, PostgreSQL, and the like. The databases may be centralized or distributed across multiple systems.

The user may enter commands and information into the computing device 401 via an input device (not shown). Input devices may comprise, but are not limited to, a keyboard, pointing device (e.g., a "mouse"), a microphone, a joystick, tactile input devices such as gloves, and other body coverings, and the like. These and other input devices may be connected to the processor 403 via a human machine interface 402 that is coupled to the system bus 413, but may be connected by other interface and bus structures, such as a parallel port, game port, an IEEE 494 Port (also known as a Firewire port), a serial port, or a universal serial bus (USB).

A display device 411 may be connected to the system bus 413 via an interface, such as a display adapter 409. It is contemplated that the computing device 401 may have more than one display adapter 409 and the computing device 401 may have more than one display device 411. A display device may comprise a monitor, an LCD (Liquid Crystal Display), or a projector. Output peripheral devices may comprise components such as speakers (not shown) and a printer (not shown) which may be connected to the computing device 401 via Input/Output Interface 410. Any step and/or result of the methods may be output in any form to an output device. Such output may comprise any form of visual representation, including, but not limited to, textual, graphical, animation, audio, tactile, and the like. The display 411 and computing device 401 may be part of one device, or separate devices.

The computing device 401 may operate in a networked environment using logical connections to one or more remote computing devices 414*a,b,c*. A remote computing device may comprise a personal computer, portable computer, smartphone, a server, a router, a network computer, a peer device or other common network node, and so on. Logical connections between the computing device 401 and a remote computing device 414*a,b,c* may be made via a network 415, such as a local area network (LAN) and a general wide area network (WAN). Such network connections may be through a network adapter 408. A network adapter 408 may be implemented in both wired and wireless environments. Such networking environments are conventional and commonplace in dwellings, offices, enterprise-wide computer networks, intranets, and the Internet.

Application programs and other executable program components such as the operating system 405 are shown herein as discrete blocks, although it is recognized that such programs and components reside at various times in different storage components of the computing device 401, and are executed by the data processor(s) of the computer. An implementation of content playback management software 406 may be stored on or transmitted across some form of computer readable media. Any of the disclosed methods may be performed by computer readable instructions embodied on computer readable media. Computer readable media may comprise any available media that may be accessed by a computer. Computer readable media may comprise "computer storage media" and "communications media." "Computer storage media" comprise volatile and non-volatile, removable and non-removable media implemented in any methods or technology for storage of information such as computer readable instructions, data structures, program modules, or other data. Computer storage media may comprise, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

Figure 5:
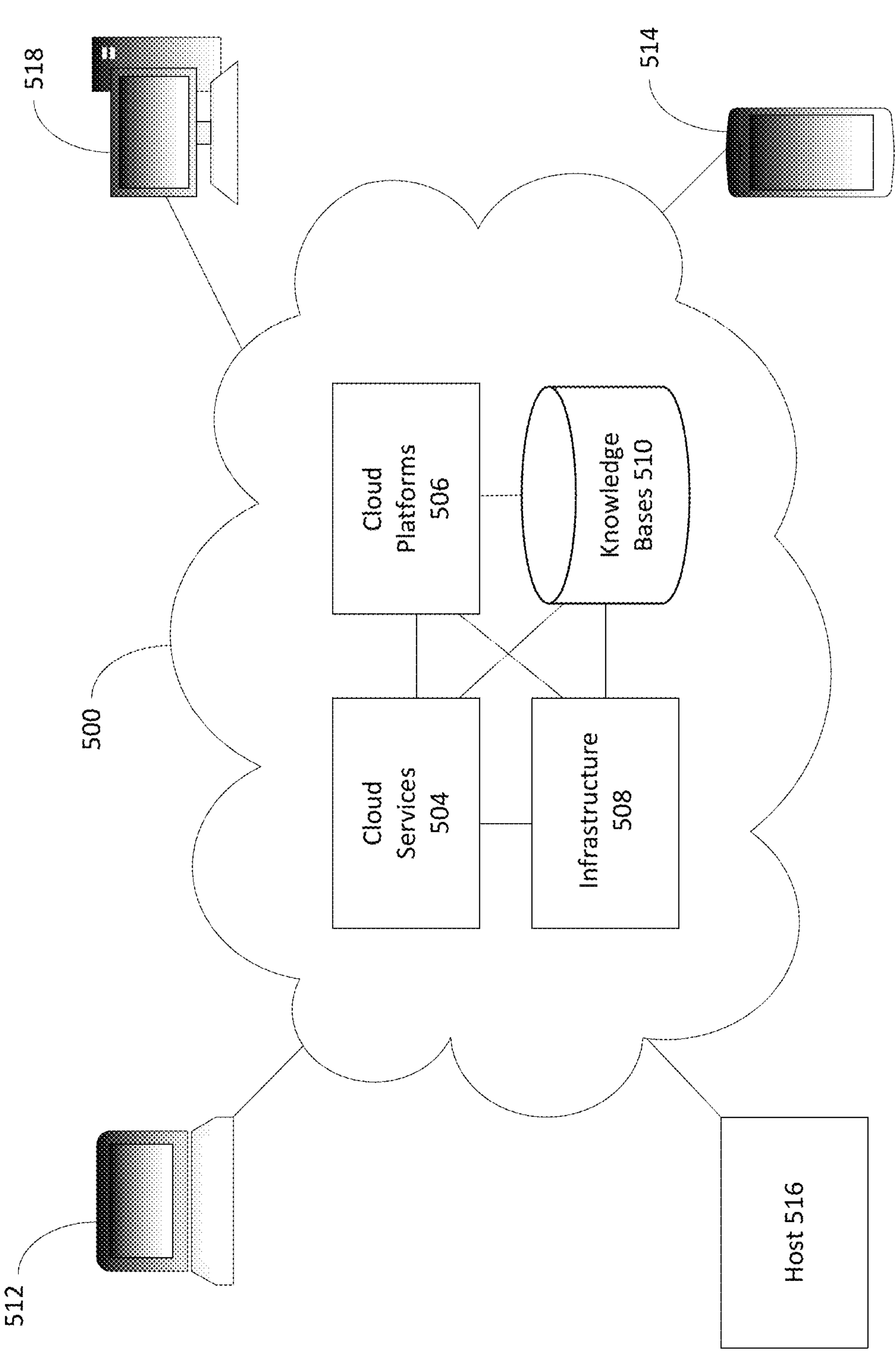
FIG. 5 shows an example cloud computing environment.

FIG. 5 shows example components of a cloud computing system 500. The cloud computing system 500 may comprise the virtual coaching assistant 100 in FIG. 1. The cloud computing system 500 may be used to perform any of the disclosed methods, such as the method 300 in FIG. 3. Cloud-based computing generally refers to networked computer architectures where application execution, service provision, and data storage may be divided, to some extent, between clients and cloud computing devices. The "cloud" may refer to a service or a group of services accessible over a network (e.g., the Internet) by clients, server devices, and cloud computing systems, for example.

In one example, multiple computing devices connected to the cloud may access and use a common pool of computing power, services, applications, storage, and files. Thus, cloud computing enables a shared pool of configurable computing resources (e.g., networks, servers, storage, applications, and services) that may be provisioned and released with minimal management effort or interaction by the cloud service provider.

As an example, in contrast to a predominately client-based or server-based application, a cloud-based application may store copies of data and/or executable program code in the cloud computing system, while allowing client devices to download at least some of this data and program code as needed for execution at the client devices. In some examples, downloaded data and program code may be tailored to the capabilities of specific client devices (e.g., a personal computer, tablet computer, mobile phone, smartphone, and/or robot) accessing the cloud-based application. Additionally, dividing application execution and storage between client devices and the cloud computing system allows more processing to be performed by the cloud computing system, thereby taking advantage of the cloud computing system's processing power and capability, for example.

Cloud-based computing can also refer to distributed computing architectures where data and program code for cloud-based applications are shared between one or more client devices and/or cloud computing devices on a near real-time basis. Portions of this data and program code may be dynamically delivered, as needed or otherwise, to various clients accessing the cloud-based application. Details of the cloud-based computing architecture may be largely transparent to users of client devices. Thus, a PC user or a robot client device accessing a cloud-based application may not be aware that the PC or robot downloads program logic and/or data from the cloud computing system, or that the PC or robot offloads processing or storage functions to the cloud computing system, for example.

The cloud computing system 500 may comprise one or more cloud services 504, one or more cloud platforms 506, cloud infrastructure 508 components, and cloud knowledge bases 510. The cloud computing system 500 may comprise more of fewer components, and each of the cloud services 504, the cloud platforms 506, the cloud infrastructure components 508, and the cloud knowledge bases 510 may comprise multiple computing and storage elements as well. Thus, one or more of the described functions of the cloud computing system 500 may be divided into additional functional or physical components, or combined into fewer functional or physical components. In some further examples, additional functional and/or physical components may be added to the examples shown in FIG. 5. Delivery of cloud computing based services may involve multiple cloud components communicating with each other over application programming interfaces, such as web services and multi-tier architectures, for example.

The example cloud computing system 500 shown in FIG. 5 may comprise a networked computing architecture. The cloud services 504 may represent queues for handling requests from client devices (e.g., a device associated with a user 102, 103, 104, 202, 203, 204). The cloud platforms 506 may comprise client-interface frontends for the cloud computing system 500. The cloud platforms 506 may be coupled to the cloud services 504 to perform functions for interacting with client devices. The cloud platforms 506 may comprise applications for accessing the cloud computing system 500 via user interfaces, such as a web browser. The cloud platforms 506 may comprise robot interfaces configured to exchange data with robot clients. The cloud infrastructure 508 may comprise service, billing, and other operational and infrastructure components of the cloud computing system 500. The cloud knowledge bases 510 may be configured to store data for use by the cloud computing system 500, and thus, the cloud knowledge bases 510 may be accessed by any of the cloud services 504, the cloud platforms 506, and/or the cloud infrastructure components 508.

Many different types of client devices may be configured to communicate with components of the cloud computing system 500 for the purpose of accessing data and executing applications provided by the cloud computing system 500. For example, a computer 512, a mobile device 514, a host 516, and a client 518 are shown as examples of the types of client devices that may be configured to communicate with the cloud computing system 500. Of course, more or fewer client devices may communicate with the cloud computing system 500. In addition, other types of client devices may also be configured to communicate with the cloud computing system 500 as well.

The computer 512 shown in FIG. 5 may comprise any type of computing device (e.g., PC, laptop computer, tablet computer, etc.), and the mobile device 514 may comprise any type of mobile computing device (e.g., laptop, smartphone, mobile telephone, cellular telephone, tablet computer, etc.) configured to transmit and/or receive data to and/or from the cloud computing system 500. Similarly, the host 516 may comprise any type of computing device with a transmitter/receiver including a laptop computer, a mobile telephone, a smartphone, a tablet computer etc., which may be configured to transmit/receive data to/from the cloud computing system 500.

Any of the client devices used with the cloud computing system 500 may comprise additional components. For example, the client devices may comprise one or more sensors, such as a digital camera or other type of image sensor. Other sensors may further comprise a gyroscope, accelerometer, Global Positioning System (GPS) receivers, infrared sensors, sonar, optical sensors, biosensors, Radio Frequency identification (RFID) systems, Near Field Communication (NFC) chip sensors, wireless sensors, and/or compasses, among others, for example.

Any of the client devices may also comprise a user-interface (UI) configured to allow a user to interact with the client device. The UI may comprise various buttons and/or a touchscreen interface configured to receive commands from a human or provide output information to a human. The UI may comprise a microphone configured to receive voice commands from a human.

In FIG. 5, communication links between client devices and the cloud 500 may comprise wired connections, such as a serial or parallel bus, Ethernet, optical connections, or other type of wired connection. Communication links may also comprise wireless links, such as Bluetooth, IEEE 802.11 (IEEE 802.11 may refer to IEEE 802.11-2007, IEEE 802.11n-2009, or any other IEEE 802.11 revision), CDMA, 3G, GSM, WiMAX, or other wireless based data communication links.

In other examples, the client devices may be configured to communicate with the cloud computing system 500 via wireless access points. Access points may take various forms. For example, an access point may take the form of a wireless access point (WAP) or wireless router. As another example, if a client device connects using a cellular air-interface protocol, such as CDMA, GSM, 3G, or 4G, an access point may be a base station in a cellular network that provides Internet connectivity via the cellular network.

As such, the client devices may comprise a wired or wireless network interface through which the client devices may connect to the cloud computing system 500 directly or via access points. As an example, the client devices may be configured to use one or more protocols such as 802.11, 802.16 (WiMAX), LTE, GSM, GPRS, CDMA, EV-DO, and/or HSPDA, among others. Furthermore, the client devices may be configured to use multiple wired and/or wireless protocols, such as "3G" or "4G" data connectivity using a cellular communication protocol (e.g., CDMA, GSM, or WiMAX, as well as for "WiFi" connectivity using 802.11). Other types of communications interfaces and protocols may be used as well.

The invention claimed is:

1. A method comprising:

training a plurality of machine learning models based at least in part on a plurality of first feature vectors comprising a plurality of features and a first plurality of corresponding values, the plurality of features comprising a first feature related to a scenario classification, a second feature related to subject demographic information, a third feature to emotional characteristics, and a fourth feature related to an interaction outcome;

receiving a request to generate a coaching suggestion from a user device associated with a first user generating a data set associated with the first user and a second user using data comprising interactions between the first user and the second user stored in a datastore, wherein the data set comprises a second feature vector including the plurality of features comprising a first feature related to a scenario classification, a second feature related to subject demographic information, a third feature to emotional characteristics, and a fourth feature related to an interaction outcome and a second plurality of corresponding values;

feeding the data set to a first machine learning model of the plurality of machine learning models, wherein the first machine learning model is configured to predict a scenario associated with the first user and the second user, wherein the scenario comprises at least one of an agent scenario, a customer scenario, or agent coaching;

determining, based on the scenario, to import a second machine learning model of the plurality of machine learning models;

feeding the data set and scenario to the second machine learning model, wherein the second machine learning model is configured to determine second model output;

feeding the second model output to a third machine learning model of the plurality of machine learning models, wherein the third machine learning model is configured to determine third model output;

generating, based on combining the second model output from the second machine learning model and the third model output from the third machine learning model, a coaching suggestion associated with the first user communicating with the second user, wherein the second model output comprises suggested content of the coaching suggestion, and wherein the third model output comprises suggested diction of the coaching suggestion;

transmitting, to the user device, the coaching suggestion; and outputting the coaching suggestion via a display or an audio component of the user device.

2. The method of claim 1, further comprising:

receiving an indication of an outcome of the coaching suggestion, wherein the outcome of the coaching suggestion comprises a response of the second user to the first user communicating with the second user; and using the outcome of the coaching suggestion to re-train at least the second machine learning model.

3. The method of claim 1, wherein the scenario further comprises at least one of a conversation topic, a user demographic, a user emotion, user pronunciation, user language, or a user identity.

4. The method of claim 3, wherein the conversation topic comprises at least one of a product, a service, an event, or another scenario.

5. The method of claim 1, wherein the determining to import the second machine learning model of the plurality of machine learning models comprises determining at least one machine learning model that is trained to receive data associated with the scenario and determine, based on the data, information configured to achieve an optimal outcome.

6. The method of claim 1, wherein the coaching suggestion comprises at least one of a script, a playbook, or a prompt.

7. The method of claim 1, wherein each of the plurality of machine learning models is trained to make predictions based on one or more features; and wherein the determining to import the second machine learning model of the plurality of machine learning models comprises determining at least one machine that is trained to make predictions based on a feature present in the data set.

8. The method of claim 1, wherein the data set is generated based on an audio recording.

9. The method of claim 1, wherein the first user comprises an agent and the second user comprises at least one of a customer or a supervisor of the agent.

10. The method of claim 1, wherein the coaching suggestion comprises a suggestion for a supervisor coaching an agent.

11. The method of claim 1, wherein the coaching suggestion comprises a suggestion for an agent communicating with a customer.

12. A non-transitory computer-readable medium comprising instructions that, when executed, cause operations comprising:

training a plurality of machine learning models based at least in part on a plurality of first feature vectors comprising a plurality of features and a first plurality of corresponding values, the plurality of features comprising a first feature related to a scenario classification, a second feature related to subject demographic information, a third feature to emotional characteristics, and a fourth feature related to an interaction outcome;

receiving a request to generate a coaching suggestion from a user device associated with a first user;

generating a data set associated with the first user and a second user using data comprising interactions between the first user and the second user stored in a datastore, wherein the data set comprises a second feature vector including the plurality of features comprising a first feature related to a scenario classification, a second feature related to subject demographic information, a third feature to emotional characteristics, and a fourth feature related to an interaction outcome and a second plurality of corresponding values;

feeding the data set to a first machine learning model of the plurality of machine learning models, wherein the first machine learning model is configured to predict a scenario associated with the first user and the second user, wherein the scenario comprises at least one of an agent scenario, a customer scenario, or agent coaching;

determining, based on the scenarios, to import a second machine learning model of the plurality of machine learning models;

feeding the data set and scenario to the second machine learning model, wherein the second machine learning model is configured to determine second model output;

feeding the second model output to a third machine learning model of the plurality of machine learning models, wherein the third machine learning model is configured to determine third model output;

generating, based on combining the second model output from the second machine learning model and the third model output from the third machine learning model, a coaching suggestion associated with the first user communicating with the second user, wherein the second model output comprises suggested content of the coaching suggestion, and wherein the third model output comprises suggested diction of the coaching suggestion;

transmitting, to the user device, the coaching suggestion; and outputting the coaching suggestion via a display or an audio component of the user device.

13. A virtual coaching assistant comprising:

one or more processors; and memory storing instructions that, when executed by the one or more processors, cause the virtual coaching assistant to:

train a plurality of machine learning models based at least in part on a plurality of first feature vectors comprising a plurality of features and a first plurality of corresponding values, the plurality of features comprising a first feature related to a scenario classification, a second feature related to subject demographic information, a third feature to emotional characteristics, and a fourth feature related to an interaction outcome;

receive a request to generate a coaching suggestion from a user device associated with a first user;

generate a data set associated with the first user and a second user using data comprising interactions between the first user and the second user stored in a datastore, wherein the data set comprises a second feature vector including the plurality of features comprising a first feature related to a scenario classification, a second feature related to subject demographic information, a third feature to emotional characteristics, and a fourth feature related to an interaction outcome and a second plurality of corresponding values;

feed the data set to a first machine learning model wherein the first machine learning model is configured to predict a scenario associated with the first user and the second user, wherein the scenario comprises at least one of an agent scenario, a customer scenario, or agent coaching;

determine, based on the scenario, to import a second machine learning model of the plurality of machine learning models;

feed the data set and scenario to the second machine learning model, wherein the second machine learning model is configured to determine second model output;

feed the second model output to a third machine learning model of the plurality of machine learning models, wherein the third machine learning model is configured to determine third model output;

generate, based on combining the second model output from the second machine learning model and the third model output from the third machine learning model, a coaching suggestion associated with the first user communicating with the second user, wherein the second model output comprises suggested content of the coaching suggestion, and wherein the third model output comprises suggested diction of the coaching suggestion;

transmit, to the user device, the coaching suggestion; and output the coaching suggestion via a display or an audio component of the user device.

14. The virtual coaching assistant of claim 13, wherein the coaching suggestion comprises at least one of product information, process information, empathy, pronunciation, dialect, or a de-escalation technique.

15. The virtual coaching assistant of claim 13, wherein the coaching suggestion comprises at least one of information about a product, information about a process, an indication of empathy, or an indication of grammar.

16. The method of claim 1, wherein the plurality of features further comprises a fifth feature related to an interaction topic and a sixth feature related to an action.

17. The non-transitory computer-readable medium of claim 12, wherein the plurality of features further comprises a fifth feature related to an interaction topic and a sixth feature related to an action.

18. The virtual coaching assistant of claim 13, wherein the plurality of features further comprises a fifth feature related to an interaction topic and a sixth feature related to an action.

* * * * *